June 18, 1968  E. C. PICKARD  3,388,921
SULKY

Filed Oct. 18, 1967  3 Sheets-Sheet 1

INVENTOR
EDGAR C. PICKARD
BY
ATTORNEY

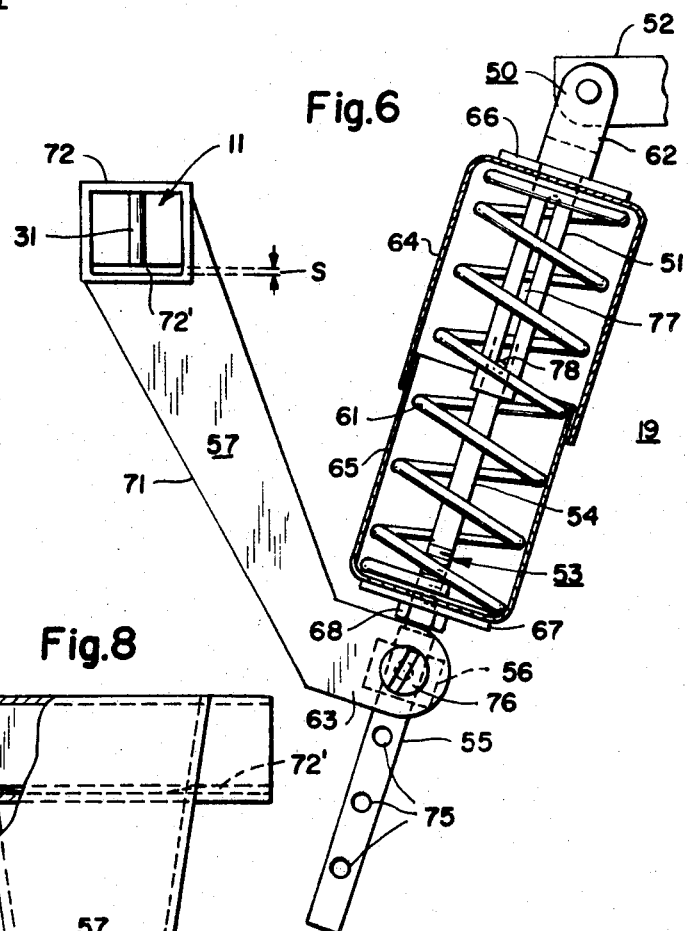

June 18, 1968  E. C. PICKARD  3,388,921
SULKY
Filed Oct. 18, 1967  3 Sheets-Sheet 3
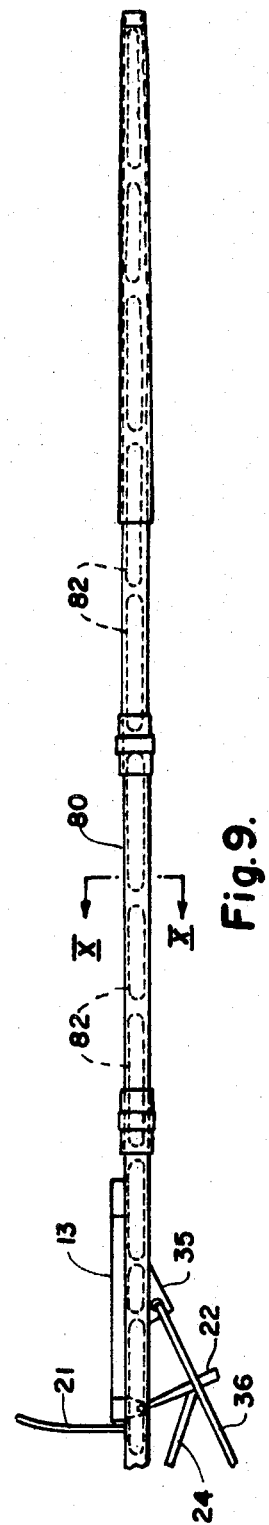
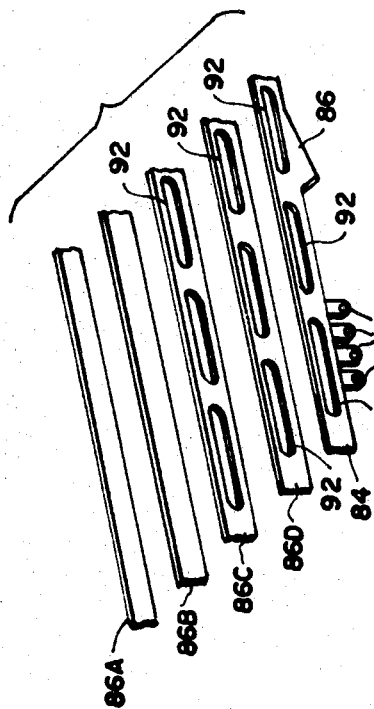
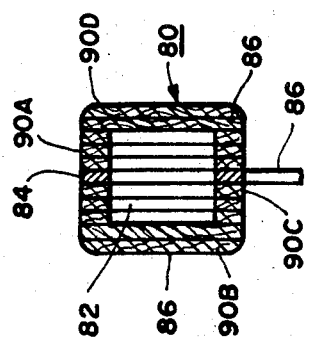
INVENTOR
EDGAR C. PICKARD
BY
ATTORNEY

United States Patent Office 3,388,921
Patented June 18, 1968

3,388,921
SULKY
Edgar C. Pickard, 1707 Mount Royal Blvd.,
Glenshaw, Pa. 15116
Continuation-in-part of application Ser. No. 501,653,
Oct. 22, 1965. This application Oct. 18, 1967, Ser.
No. 683,068
9 Claims. (Cl. 280—63)

ABSTRACT OF THE DISCLOSURE

The invention relates to racing sulkies and jog carts, and in particular an improved laminated shaft and seat construction for racing sulkies and job carts, respectively. The shaft is composed of a plurality of laminations at least one of which is of metal and provided with projections which extended beyond the other laminations for attachment to other sulky or jog cart structure. The seat construction includes adjustable springs for adjusting the seat height in accordance with the height and weight of a driver.

Reference to related application

This application is a continuation-in-part of copending application Ser. No. 501,653, filed Oct. 22, 1965, now abandoned.

Background of the invention

Heretofore, the shafts or thills of sulkies have been made of wood, usually hickory or ash, which is steamed and then formed into the desired shape. In order to obtain the desired strength, the members must be relatively heavy. Furthermore, if a member is broken by an accident, there is danger of splintering which may result in injury to the horse and/or the driver.

Summary of the invention

An object of the invention is to increase the strength without increasing the weight of a job cart and to decrease the weight of a racing sulky without decreasing its strength.

Another object of the invention is to provide a sulky having members which will not splinter when broken.

A further object of the invention is to provide a sulky with shafts which do not require the drilling of holes through the shafts to attach other members to the shafts.

Still another object of the invention is to provide for adjusting the spring pressure on the seat on a jog cart in accordance with the weight of the driver and also to vary the height of the seat so as to obtain good visibility on a crowded race track.

A still further object of the invention is to prevent deterioration of wood members of a sulky.

Other objects of the invention will be explained fully hereinafter, or will be apparent to those skilled in the art.

In accordance with one embodiment of the invention, the shafts or thills of a sulky are of a laminated construction having a center lamination composed of aluminum, or other relatively light metal, and outer laminations composed of wood, for example, maple. At predetermined locations, projections on the aluminum lamination extend downwardly below the wood laminations to permit the attachment of frame and support members to the projections without drilling holes into the main shafts which would weaken the shafts and also allow moisture to deteriorate the wood. It is apparent with this type of construction that the outer laminations could be eliminated entirely thus giving, if practical, the lightest known design of body. Compression coil springs are so attached to the seat and the shafts that the spring pressure and seat height can be adjusted in accordance with the weight and height of the driver. In this respect, the invention is shown herein as applied to a jog cart used to train trotting horses. However, it will be appreciated that many of the principles of the invention, particularly the laminated shaft construction, are equally applicable to racing carts.

In another embodiment of the invention, inner ones of the aforesaid laminations from which the shafts are formed are provided with cutout portions such that each shaft, when assembled, has cavities spaced along its length. Contrary to what might be expected, this does not decrease the strength of the shaft but nevertheless materially decreases its weight, an obvious advantage in any type of racing vehicle.

For a better understanding of the nature and objects of the invention, reference may be had to the following detailed description, taken in conjunction with the accompanying drawings, in which:

FIG. 4 is an enlarged view, in section, taken along the line IV—IV of FIG. 5;

FIG. 5 is an enlarged view, in side elevation, of a portion of a shaft of the cart, portions being broken away to show a metal lamination utilized in the shaft;

FIG. 6 is an enlarged view of a bracket and spring assembly for supporting the seat for the driver;

FIGS. 7 and 8 are detailed views of the bracket shown in FIG. 6;

FIG. 9 is an elevational view of an alternative embodiment of the shaft of the invention having hollow portions spaced along its length;

FIG. 10 is a cross-sectional view taken along line IX—IX of FIG. 9; and

FIG. 11 illustrates the manner in which the hollow shaft construction of the invention is formed.

Figure 1:
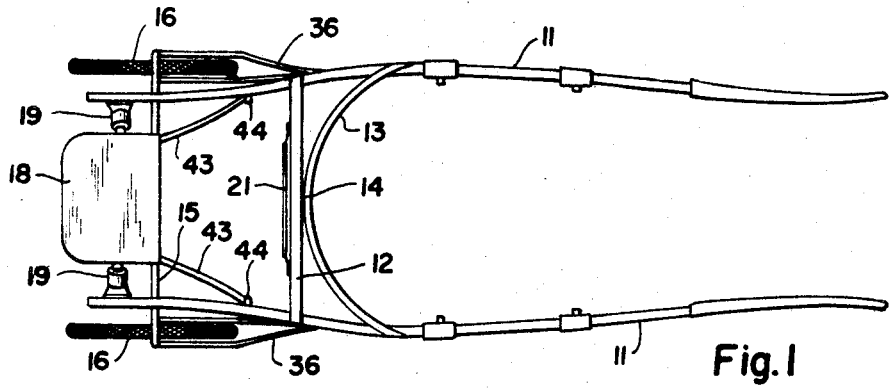
FIGURE 1 is a view, in plan, of a jog cart embodying principal features of the invention.
Figure 2:
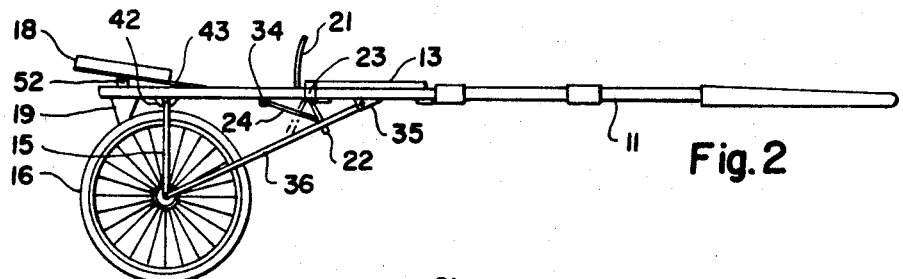
FIG. 2 is a view, in side elevation, of the cart shown in FIG. 1.
Figure 3:
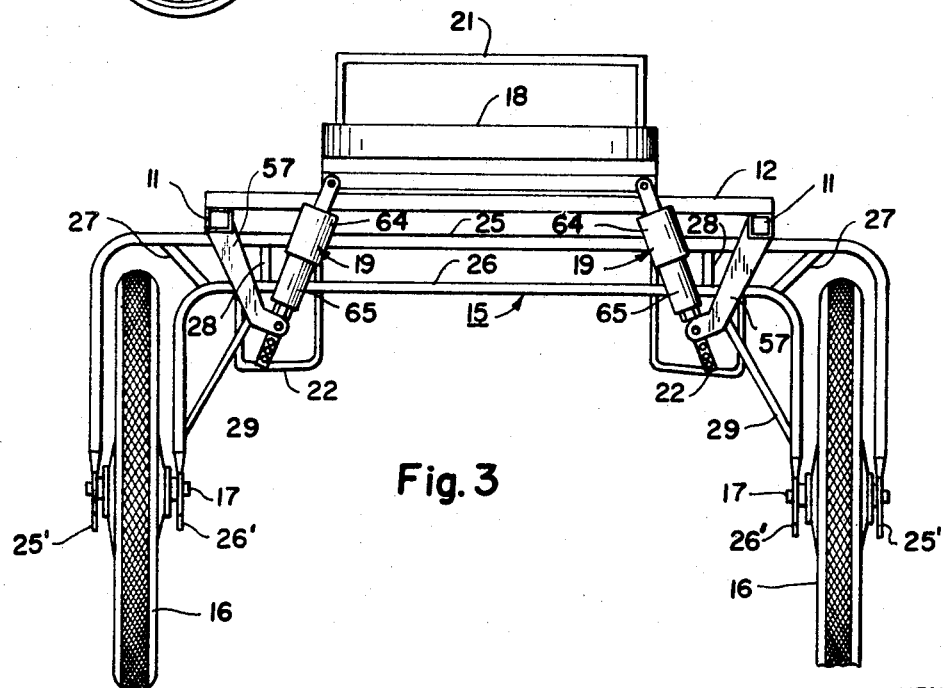
FIG. 3 is an enlarged view, in rear elevation, of the cart.

Referring to the drawings, and particularly to FIGS. 1, 2 and 3, the jog cart or sulky shown therein comprises a pair of spaced thills or shaft 11 tied together by a straight cross member 12 and a curved cross member 13 tangentially attached to the member 12 at 14, a transversely disposed inverted U-shaped main frame 15 (FIG. 3), a pair of wheels 16 rotatably mounted on axles 17 carried by the legs of the frame 15, a seat 18 pivotally attached to the shafts 11, and spring assemblies 19 for resiliently supporting the seat 18. A windshield 21 may be attached to the cross member 12. Two stirrups 22 are pivotally mounted on brackets 23 (FIG. 2) attached to the cross member 12. The position of the stirrups may be adjusted by means of stirrup supports 24 attached to the shafts 11 in a manner described more fully hereinafter.

As shown more clearly in FIG. 3, the main frame 15 is composed of metal tubing, such as aluminum, and comprises two spaced inverted U-shaped members 25 and 26 joined by struts or braces 27 and 28. Diagonal braces 29 extend between the legs of member 26 and the bight or base of the member. The axles 17 extend between the spaced legs of the U-shaped members 25 and 26. Thus, the wheels 16 are disposed between the spaced legs.

Prior art carts of the general type shown herein are usually provided with two sets of wheels of different diameters to accommodate different-sized horses. In accordance with the present invention, however, extensions 25′ and 26′ are provided on the opposite, lower ends of the U-shaped members 25 and 26, these extensions being provided with holes for receiving the ends of the wheel axles. Thus, the same diameter wheels can be used for any size horse simply by selecting the upper or lower sets of axle holes in the lower ends of members 25 and 26.

As shown in FIG. 4, each shaft 11 comprises a plurality of laminations, at least one of which is composed of light metal 31, preferably aluminum or magnesium, disposed at the longitudinal center line of the shaft. The other laminations 32 are composed of wood, preferably maple. The wood laminations are glued to each other and to the metal lamination with a suitable adhesive, such as an epoxy resin. The aluminum or magnesium lamination is preformed to the contour of the center line of the shaft and is then used as a form for setting the wood laminations during construction.

As shown more clearly in FIG. 5, each metal lamination 31 has integral downwardly-extending projections 33, 34 and 35 thereon. The corresponding projections on the laminations in the two shafts 11 are disposed transversely opposite each other. The projections 33 are utilized to attach the main frame 15 to the shafts. The projections 34 are utilized to attach the seat 18 and the stirrup supports 24 to the shafts. The projections 35 are utilized to attach ends of frame supports 36 to the shafts. The other ends of the supports 36 are attached to the wheel axles 17. Additional projections 37 and 38 may be provided on the metal laminations for attaching mudguards to the shafts.

The projection 33 has a substantially semicircular notch 41 therein open at the bottom for receiving the upper member 25 of the main frame 15. A plate 42 (FIG. 2) having a similar notch therein open at the top overlaps the projection 33 and is attached thereto by bolts to attach the frame 15 to the shaft 11. The seat 18 has two arms 43 (FIGS. 1 and 2) each one of which is pivotally attached to one of the projections 34 by a bolt 44 extending through a hole in the projection 34. The same bolt is utilized to attach the stirrup support 24 to the projections 34. The support 24 has a plurality of spaced keyhole openings therein, not shown, for receiving a rivet on the stirrup 22 to adjust the position of the stirrup from the full line to dotted line positions shown in FIG. 2. As previously explained, one end of each frame support 36 is attached to one of the projections 35.

Thus, the main frame, the seat, the stirrup supports and mudguards are attached to the shafts 11 without drilling holes in the shafts which would weaken the shafts. Furthermore, holes in the shafts would allow moisture to deteriorate the wood. If a shaft should be broken by an accident, the laminated construction prevents splintering of the wood, thereby reducing the danger of injury to the horse and/or the driver.

As shown in FIG. 6, each spring assembly 19 comprises a clevis 50 pivotally attached to a cross member 52 on the seat 18, a rod 53 having a round portion 54 slideably disposed in a portion 51 of the clevis 50 and a square portion 55 adjustably disposed in a trunnion 56 mounted in a bracket 57 attached to shaft 11 in a manner hereinafter described. A compression coil spring 61 surrounds the clevis portion 51 and the rod 54 between an enlarged bifurcated portion 62 of the clevis and a portion 63 of the bracket 57. The spring 61 may be enclosed by cup-shaped telescoping housing members 64 and 65 mounted on the clevis portion 51 and the rod portion 54, respectively. A washer 66 is disposed between the member 64 and the enlarged portion 62 of the clevis 50. Likewise, a washer 67 is disposed between the member 65 and a nut 68 threaded on the round portion 54 of the rod 53.

The bracket 57 is shown in more detail in FIGS. 7 and 8. It comprises a generally channel-shaped member having sides 71 secured to a section of square tubing 72 as by welding or riveting. The tubing 72 is received over the end of the shaft 11, but is of greater vertical depth than shaft 11 to provide a space S (FIG. 6) between the bottom of the shaft and the inside bottom surface of the tubing. In order to secure the tubing and, hence, the bracket 57 to the shaft 11, wedges 72', best shown in FIG. 8, are driven into the aforesaid space from the opposite ends of the tubing. Here, again, no bolts are driven through the shafts for fastening purposes.

In order to adjust the height of the seat 18 to accommodate any particular driver, spaced holes 75 are provided in the square portion 55 of the spring rod 53. A screw 76, threaded into the trunnion 56, is inserted into a preselected one of the holes 75, depending upon the seat height desired. Adjustments in the pressure of spring 61 are obtained by means of the nut 68 on the rod 54. The upper end of the rod 54 is retained in a slot 77 in the clevis portion 51 by a pin 78. Thus, the spring 61 can be preloaded in accordance with the weight to be carried by the seat 18. Both spring assemblies 19 can be adjusted in the same manner.

With reference, now to FIGS. 9, 10 and 11, another embodiment of the invention is shown wherein the shaft or thill 80 is similar to that of the previous embodiment, except that it is provided with hollow cavities 82 along its length, thereby further decreasing its weight. As shown in FIG. 10, the shaft 80 again comprises a plurality of laminations, at least one of which, preferably the central lamination 84, is formed from a light metal such as aluminum or magnesium and having one or more projections 86 which extend outwardly beyond the main body of the shaft. The other laminations 86 are preferably formed from wood and are glued to each other and the central, metallic lamination 84 with a suitable adhesive, such as an epoxy resin. The outer two laminations in the cross section of FIG. 10 are solid, while the remainder, including the central metallic lamination 84 have cutout portions 92 (FIG. 11) to provide a cavity 82 enclosed by four side walls 90A, 90B, 90C and 90D.

The manner in which the shaft of FIGS. 9 and 10 is formed is shown in FIG. 11. The outer two wood laminations 86A and 86B, for example, are solid. However, the next two laminations 86C and 86D are provided with elongated cutout portions 92 which, when the shaft is assembled, are in alignment with each other to form the cavities 82. The central metallic shaft 84 is also provided with elongated cutout portions 92; and it will be appreciated that when the laminations are assembled, a shaft will be formed which appears solid from the outside but which has the spaced cavities 82 along its length. This materially decreases the weight of the shaft but does not materially decrease its strength.

From the foregoing description it is apparent that the invention provides a sulky which is stronger than prior sulkies of the same weight and is safer than prior carts. The resiliently mounted seat can be readily and accurately adjusted in accordance with the weight of the driver so as not to sink excessively. This affords good visibility on a crowded track. If it were not for this feature, the height of the seat would have to be raised to an impractical height, thus making it difficult if not impossible to climb onto the cart.

Since numerous changes may be made in the above-described construction, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In a sulky, in combination, a shaft comprising a plurality of laminations, at least one of said laminations being composed of metal with projections thereon extending beyond the other laminations, a plurality of wood laminations on either side of the metal lamination, a main frame attached to one of said projections, and a brace for the frame attached to another one of said projections.

2. The combination of claim 1, wherein the other laminations are composed of wood glued to each other and to the metal lamination.

3. The combination of claim 1, wherein the metal lamination is at the longitudinal center line of the shaft.

4. The combination of claim 1, wherein at least some of said laminations have cutout portions along their lengths to provide cavities spaced along the length of the shaft.

5. The combination of claim 1, wherein the sulky has two transversely spaced shafts, at least some of the projections on the respective shafts being transversely opposite each other, a transversely disposed main frame attached to transversely opposite ones of said projections, braces for the frame attached to other transversely opposite ones of said projections, and a seat pivotally attached to still other transversely opposite ones of said projections.

6. The combination of claim 5, wherein the other laminations of each shaft are composed of wood glued to each other and to the metal laminations, and the metal lamination of each shaft is at the longitudinal center line of the shaft.

7. The combination of claim 5 including a bracket attached to each shaft behind said frame, and a compression coil spring mounted between each bracket and the seat to resiliently support the same.

8. The combination of claim 7 including means for adjusting the pressure of the coil springs on the seat.

9. Adjustable means for resiliently supporting a seat pivotally attached to a sulky comprising a bracket fixedly attached to the sulky, a clevis pivotally attached to the seat, a rod slideably disposed in the clevis, a compression coil spring surrounding the clevis and the rod between the bracket and the seat, and adjustable means for attaching the rod to the bracket to preload the spring in accordance with the weight to be carried by the seat, the adjustable means including a trunnion mounted in the bracket and having a hole therethrough for receiving said rod with means for adjusting the position of the rod in the trunnion.

References Cited
UNITED STATES PATENTS

| | | | |
|---|---|---|---|
| 377,849 | 2/1888 | Cloyes | 280—70 |
| 444,921 | 1/1891 | Paul | 280—63 |
| 510,248 | 12/1893 | Faber | 280—63 |
| 2,252,956 | 8/1941 | Adler | 52—376 |
| 2,707,986 | 1/1955 | Johnson | 297—314 |

BENJAMIN HERSH, *Primary Examiner.*

J. A. PEKAR, *Assistant Examiner.*